Figure 1:
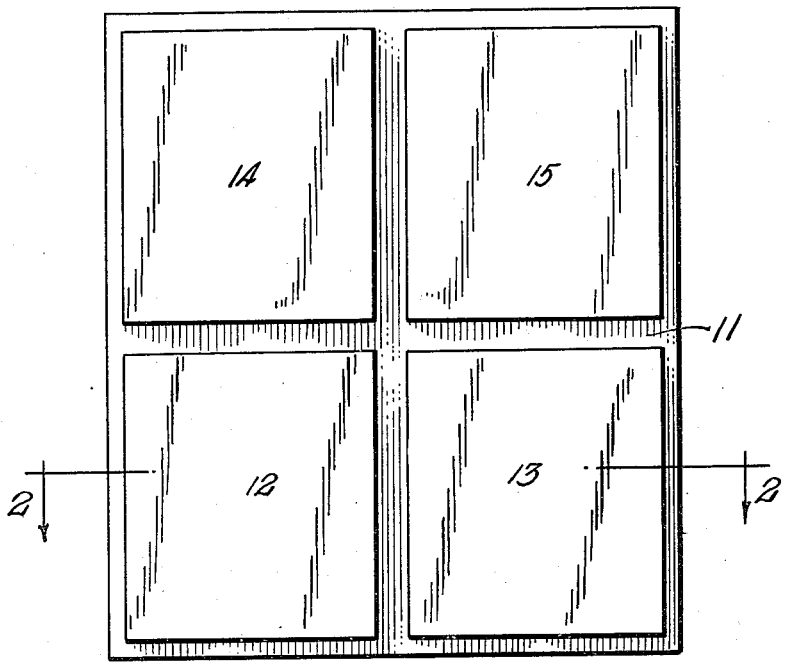

Dec. 25, 1945.   R. R. TANNER   2,391,656
TREATED METAL SHEET AND METHOD OF MAKING SAME

Filed March 31, 1942

INVENTOR:
ROBERT R. TANNER

BY Scott H. Lilly
ATTORNEY

Patented Dec. 25, 1945

2,391,656

UNITED STATES PATENT OFFICE 2,391,656

TREATED METAL SHEET AND METHOD OF MAKING SAME

Robert R. Tanner, Bloomfield Village, Mich., assignor to Parker Rust-Proof Company, Detroit, Mich.

Application March 31, 1942, Serial No. 436,969

6 Claims. (Cl. 113—120)

This invention relates to a method of fabricating articles which require soldering operations and, more particularly, containers such as used for foodstuffs, paint, oil, etc., and to the article produced thereby.

Ordinary metal cans are customarily made from steel sheets having a thin coating of tin on the surface. The tin furnishes a considerable amount of corrosion resistance and also facilitates any necessary soldering operations.

Some lacquers that are exceptionally suitable as food container liners deteriorate when applied to ferrous metal due to a destructive reaction which takes place, particularly during the baking of the paint. This does not occur to any appreciable extent with tin, but occurs with different siccative coats to different degrees with various metals.

In the manufacture of can bodies, it is the usual practice to cut up the large tinned sheets to the dimensions required, after which the small sheets are shaped into the form of the can body and soldered at the seam where the edges of the metal join. The tin, being very ductile, adheres uniformly to the base metal during the forming operation.

The increasing scarcity of tin has led to an investigation of possible alternative surface treatments with the discovery that certain coatings formed by chemical reaction with the metal surface may be employed in place of tin in a great many instances with entire satisfaction, and which also have a paint bonding effect.

I have found that insoluble phosphate coatings formed in situ by reaction with the surface of the metal being treated may be substituted for tin with good results, provided certain precautions are observed during the preparation of the coating and subsequent fabricating operations.

Ordinary phosphate coatings produced by the well known Parkerizing process weigh in the neighborhood of 2000 milligrams per square foot of surface treated. Those intended primarily for paint bonding, such as the conventional Bonderite coatings employed extensively for the treatment of fabricated sheet metal, ordinarily run in excess of 200 milligrams per square foot. Although coatings of this weight are entirely suitable for the treatment of metal articles which have already been given their final shape, they are entirely unsuitable for the treatment of flat sheets which are to be subsequently fabricated into articles where the fabricating steps involve severe deformation as in forming cans. Phosphate coatings are characteristically crystalline, and when present on a metal surface in too great an amount per unit area, will crumble and become pulverized when the underlying metal is even mildly bent. The coating thus becomes loosened and is readily brushed away. This results in a serious loss of corrosion resistance and in the adhesion of a paint film applied thereover.

It has now been found that a coating that is at the same time continuous and not over approximately 110 milligrams per square foot of surface treated undergoes the forming operations incident to the manufacture of cans and the like with no more than an insignificant loss of adhesion to the underlying metal.

A further advantage arises from the use of the modified phosphate coating. It is practically impossible to solder coatings such as previously referred to, weighing around 2000 milligrams per square foot, even when an acid flux is employed. Those weighing as little as 200 milligrams per square foot are soldered only with difficulty. When the weight is decreased by proper means to approximately 110 milligrams per square foot or less, soldering is readily accomplished with an acid flux and, if the soldering operation is not too rapid, neutral fluxes are sufficiently effective. For rapid soldering, however, an acid flux is preferred even where the phosphate coating weighs less than 110 milligrams.

The disadvantage in employing an acid flux lies in the fact that the coating will be removed not only where it is intended to solder, but also from the surrounding areas where the phosphate coating should be retained. Moreover, there is apt to be some spattering of the flux over a relatively widespread area and the coating will also be weakened, if not removed, at these points.

I have found that if a phosphate coated sheet is first painted over its entire surface except for those areas which are to be subsequently soldered, the soldering operation may thereafter be performed with no unwanted removal of the coating. Large sheets to be formed into relatively small containers may be painted by roller coating methods whereby narrow strips of the phosphate coating are left unpainted. The sheets are cut lengthwise through the centers of the unpainted strips in order to produce blanks for the size of the body desired. Where the relative size of sheet and container is such that only one container body is formed from one sheet, only the edges of the sheet need be left unpainted. During fabrication the blank is formed, for example, into a cylinder, so that the phosphate coated and unpainted areas are brought together and formed into a soldered seam. Care should be taken to assure complete coverage of the unpainted area, since it is not satisfactorily protected without solder.

Any creepage of the soldering flux is prevented by the paint adjacent the area being soldered, and if spattering occurs over the paint it can do no harm to the phosphate coating underneath.

Figure 2:

In the drawing forming a part of this specification, one sheet made in accordance with this invention is illustrated. Fig. 1 shows a plan view of the sheet and Fig. 2 shows a cross section of the sheet on the line 2—2 of Fig. 1, the thickness of the layers being exaggerated for ease of illustration.

A suitable sheet of metal 10 is coated with a thin chemical coating 11, and over this there is applied on one side a series of rectangular patches 12, 13, 14 and 15, of a suitable siccative coating with uncoated margins where the sheet may be soldered. The pattern of the siccative coat will depend, of course, upon the shape and size of the containers to be formed and also upon the way in which the soldered seams are to be formed. In some instances, the sheets will be soldered only along the longitudinal can seams while the ends will be merely crimped or rolled to unite them with the end closures.

It is to be understood that the joint or seam to be soldered does not necessarily have to be formed by the bringing together of two different edges of a single piece of metal. The procedure is equally applicable to instances where it is desired to join two or more edges of separate pieces of metal, for example, the body and bottom or top of a container.

Processing solutions in common use for the treatment of fabricated articles are not suitable for producing the phosphate coatings required in connection with the present invention. Complete coverage of the metal treated with such solutions is not reached until a coating of too great a weight for present purposes is obtained. It is necessary to produce both uniform coverage and a low coating weight at the same time, and to accomplish this it is necessary to cause a very rapid acceleration of the coating action. This results in the formation of unusually small phosphate crystals which cover the metal much more quickly than the coarser crystals obtained by less accelerated action.

As a specific example of one manner in which suitable coatings may be produced, a solution is prepared so as to conform to approximately the following analysis:

| | | |
|---|---|---|
| F. A. | cc | 2.0 |
| T. A. | cc | 18–20 |
| $NO_3$ | Percent | .25–1.5 |
| Zn | do | .45–.55 |
| $ClO_3$ | do | 2.0 |
| $PO_4$ | do | .6–1.0 |
| Cu | do | .0005–.002 |

The free and total acid, referred to above as F. A. and T. A., represent the number of ccs. of N/10 sodium hydroxide required to titrate a 10 cc. sample of the solution when methyl orange and phenolphthalein are used, respectively, as indicators.

The solution is heated to 160° F. and clean ferrous metal can stock is treated with it for a period of 10 seconds. During this time, the metal is subjected to a repeated forceful contact between a series of pairs of resilient rubber rolls. This operation acts to further accelerate the coating formation. The coated sheet is then water rinsed and given a final rinse with a dilute solution of chromic acid, after which it is dried. It is then ready to be painted and fabricated in the manner previously described.

Suitable phosphate coatings may be obtained on other metals also, such as zinc, cadmium, copper, and tin, by the use of properly accelerated solutions and proper control of their application.

It is within the scope of my invention to tin the unpainted strips prior to the soldering operation proper. This may be accomplished by first removing the chemically formed coating by means of a suitable flux either prior to or in conjunction with the tinning operation.

It can be seen from the above description that the success of my invention depends on the production on the sheet metal surface of a nonmetallic coating, the formation of which involves chemical reaction with the metal surface, the coating being limited in weight to not over 110 milligrams per square foot of surface treated, and on the painting of the coating on all surfaces except those intended to be soldered, prior to soldering operation. The chemical coating must be substantially continuous and thin, and since it is produced by chemical reaction with the metal, the removal of the thin chemical coating by flux uncovers a uniform metal surface to which the solder may readily and uniformly adhere, so that a reliable, continuous soldered seam is readily produced without the use of tin.

The described method may be applied to the manufacture of articles, such as pails and other metallic packages of various descriptions, but the article in its preferred form is represented by a cylindrical can body produced by means disclosed.

In the appended claims the terms "lacquer" and "siccative coat" are employed for brevity to cover any suitable paint, lacquer, or enamel.

What I claim is:

1. A ferrous sheet for forming containers, said sheet being coated with a fine-grained continuous phosphate coating weighing not over 110 milligrams per square foot of coated surface and having exposed areas where, and only where, the sheet is intended to be soldered in forming the container and having dried onto the rest of the surface a lacquer which is resistant to soldering flux.

2. A ferrous sheet for forming containers, said sheet being coated with a fine-grained continuous phosphate coating weighing not over 110 milligrams per square foot of coated surface and having exposed areas where, and only where, the sheet is intended to be soldered in forming the container and having baked onto the rest of the surface a lacquer of the kind that is injured by direct contact with iron during baking.

3. A method of making containers from ferrous sheets which comprises reacting the surface of the sheet with an accelerated phosphate coating solution and thereby producing on the metal surface a continuous, uniform, paint-bonding coating, stopping said reaction before the amount of coating produced exceeds 110 milligrams per square foot of coated surface, baking lacquer onto said coated surface except for areas to be united in forming containers, which lacquer is resistant to soldering flux, removing by soldering flux the exposed phosphate coating on said areas and completely covering with solder and uniting in soldered seams the metal surfaces exposed by removal of the phosphate coating.

4. A method of making containers from ferrous sheets which comprises reacting the surface of the sheet with an accelerated phosphate coating solution and thereby producing on the metal surface a continuous, uniform, paint-bonding coating, stopping said reaction before the amount of coating produced exceeds 110 milligrams per square foot of coated surface, baking a lacquer, which would be injured by direct contact with iron during the baking operation and which is resistant to soldering flux, onto said coated surface except for areas to be united in forming containers, removing by soldering flux the exposed phosphate coating on said areas and completely covering with solder and uniting in soldered seams the metal surfaces exposed by removal of the phosphate coating.

5. A method of making containers from ferrous sheets which comprises reacting the surface of the sheet with an accelerated zinc phosphate coating solution and thereby producing on the metal surface a continuous, uniform, paint-bonding coating, stopping said reaction before the amount of coating produced exceeds 110 milligrams per square foot of coated surface, baking a lacquer, which would be injured by direct contact with iron during the baking operation and which is resistant to soldering flux, onto said coated surface except for areas to be united in forming containers, removing by soldering flux the exposed phosphate coating on said areas and completely covering with solder and uniting in soldered seams the metal surfaces exposed by removal of the phosphate coating.

6. A ferrous sheet for forming containers, said sheet being coated with a fine-grained continuous coating of zinc and iron phosphates, said coating weighing not over 110 milligrams per square foot of coated surface and having exposed areas where, and only where, the sheet is to be soldered in forming the container and having dried onto the rest of the surface a lacquer which is resistant to soldering flux.

ROBERT R. TANNER.